C. B. BUERGER.
LIQUID SOAP DISPENSING DEVICE.
APPLICATION FILED APR. 25, 1913.
1,080,196.
Patented Dec. 2, 1913.
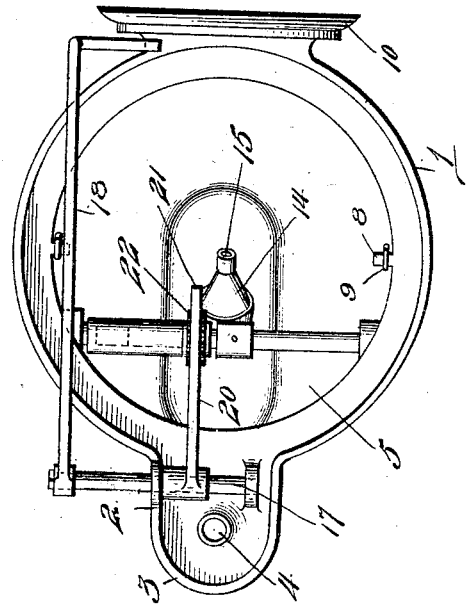
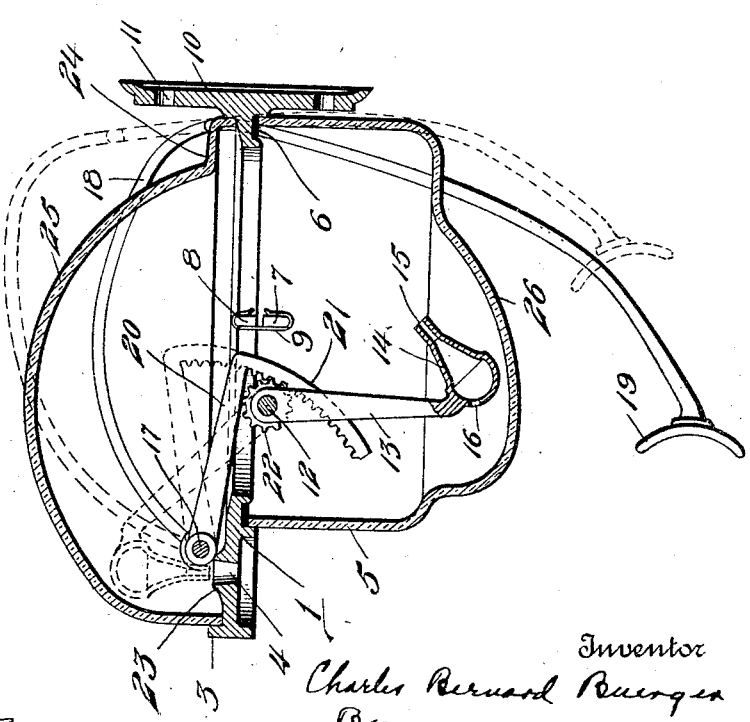
Inventor
Charles Bernard Buerger
By
Foster, Freeman, Watson & Coit
Attorneys
Witnesses

UNITED STATES PATENT OFFICE.

CHARLES BERNARD BUERGER, OF NEW YORK, N. Y., ASSIGNOR OF ONE-HALF TO SIGMUND LIPPSTADT, OF NEW YORK, N. Y.

LIQUID-SOAP-DISPENSING DEVICE.

1,080,196.        Specification of Letters Patent.        Patented Dec. 2, 1913.

Application filed April 25, 1913.   Serial No. 763,666.

*To all whom it may concern:*

Be it known that I, CHARLES BERNARD BUERGER, a citizen of the United States, residing at New York, in the county and State of New York, have invented certain new and useful Improvements in Liquid-Soap-Dispensing Devices, of which the following is a specification.

This invention relates to liquid dispensing machines and has particular reference to a device for dispensing liquid soap.

It has been my object to simplify the construction of such devices, making one which can be easily manufactured and which will be easily operated to discharge on the hands of the user a predetermined amount of soap.

The novel features of the invention will be apparent from the following description taken in connection with the accompanying drawings:

In the drawings: Figure 1 is a vertical section through a device embodying my invention; and Fig. 2 is a top plan view.

As shown in these drawings my device is made up of a ring 1, which is preferably made of metal and which has at one side a projection or offset portion 2 surrounded by the rim 3 and having the vertically extending discharge opening 4. The vertical wall 3 extends entirely around the ring 1 forming a ledge on the interior of the ring which, as seen in Fig. 1, is inclined downwardly so that any liquid falling on it will not remain. A bowl 5, which I preferably make of glass, fits against the under surface of the ring 1, a groove being formed on the lower face of the ring to receive the upper edge of the bowl, as shown in Fig. 1, and a gasket 6 of rubber or other suitable material is interposed between the bowl and ring to make a liquid-tight joint. The bowl has on its inner face, near the top, inwardly projecting lugs 7 and other corresponding lugs 8 on the inner face of the ring and as shown in Fig. 1 a spring clip 9 fits over these two lugs holding the parts firmly together. It will be observed that the spring clip is so formed that it can be opened to release the parts so that the bowl can be easily removed. The ring 1 is preferably formed integral with a plate 10 which extends vertically and which is provided with openings 11 so that the apparatus can be secured to the wall or to some other support by screws or other fastening means.

A rotary shaft 12 is mounted in bearings in the ring 1 and it carries an arm 13 rigidly secured to it. At the lower end of this arm there is a dipping receptacle 14 which is provided with the contracted mouth or outlet 15 and which has a small air vent opening 16 in the bottom. This dipping receptacle is of such size that it will contain the right amount of soap to be discharged on the hands and it normally hangs down in the receptacle below the liquid level, as shown in Fig. 1. When the shaft 12 is turned and the dipping receptacle 14 is raised up out of the liquid it passes over to the position shown in dotted lines in Fig. 1 directly above the opening 4, its mouth 15 being in line with that opening. The bent opening 16 is not sufficiently large to permit the loss of the material while the receptacle is being elevated, but it allows air to enter the receptacle when it is inverted, as shown in dotted lines, so as to permit the soap freely to escape. A second shaft 17 is mounted in bearings on the ring 1 and is adapted to be turned by a handle 18 secured to it at one end outside of the receptacle and outside of the ring 1. This handle 18 has a portion extending down below the receptacle and to a lower level than the discharge opening 4, terminating in a curved plate 19. An arm 20 is secured to the shaft 17 within the receptacle and it has on its outer end the toothed segment 21 which engages the teeth of the pinion 22 carried by shaft 12. The result of this connection between the two shafts is that any turning movement of the shaft 17 is transmitted to the shaft 12 multiplied or, in other words, the shaft 12 will turn faster than the shaft 17. The position of the operating handle 18 is such that when the user of the device places his hand below the opening 4 to receive a discharge of soap he presses the handle 18 turning the shaft 17 and thus raising the receptacle 14 up to a position over the opening 4, discharging soap into his hand. I preferably place a lip 23 around the opening 4 and the surface of the extension 2 is inclined toward the bowl 5 so that any liquid accidentally getting on it will run back into the bowl.

I place a cover 24 over the ring 1 covering the mechanism within the receptacle for discharging soap and this cover therefore has a projecting portion extending out over the projection 2 and it is made more elevated along the part marked 25 so that the receptacle 4 may pass up into it to the discharge point.

Instead of making the bowl 5 sufficiently deep throughout to accommodate the receptacle 14 I preferably make a narrow depression 26 in the bottom of the bowl 5 in which the receptacle 14 normally rests and by this means I am enabled automatically to discharge more nearly the entire contents of the receptacle.

Having thus described the invention what is claimed as new is:

1. The combination with a liquid receptacle having an opening above the liquid level for the discharge of material, of means within said receptacle for dipping up a predetermined amount of liquid, conveying it to and discharging it through said opening, and a handle for operating said dipping and conveying means below said opening arranged in the path of the operator's hand when placed below said opening to receive the discharge whereby the act of placing the hand in position may cause the dipping and discharging operation.

2. In a device of the class described, the combination with a metal rim, of a bowl for containing liquid secured to the bottom of said rim, a projection on one side of said rim extending beyond the edge of said bowl and having a discharge opening through it, and means carried by said rim for dipping a predetermined amount of liquid from said bowl and discharging it through said opening.

3. In a device of the class described, the combination with a metal rim, of a bowl for containing liquid secured to the bottom of said rim, a projection on one side of said rim extending beyond the edge of said bowl and having a discharge opening through it, means carried by said rim for dipping a predetermined amount of liquid from said bowl and discharging it through said opening, and a cover over said rim and projection.

4. In a device of the class described, the combination with a metal rim, of a bowl for containing liquid secured to the bottom of said rim, a projection on one side of said rim extending beyond the edge of said bowl and having a discharge opening through it, a shaft mounted in and extending across said rim, an arm secured to said shaft extending down into the liquid, a dipping receptacle carried by said arm, and means for turning said shaft to raise said receptacle and discharge it through said opening.

5. In a device of the class described, the combination with a metal rim, of a bowl for containing liquid secured to the bottom of said rim, a projection on one side of said rim extending beyond the edge of said bowl and having a discharge opening through it, a shaft mounted in and extending across said rim, an arm secured to said shaft extending down into the liquid, a dipping receptacle carried by said arm, a second shaft carried by said rim, an arm outside of said rim and bowl for operating said second shaft having a portion to be operated by a hand placed below said opening, and means connecting said shafts whereby any motion of the second will be transmitted multiplied to the first to raise said dipping receptacle and discharge it through said opening.

In testimony whereof I affix my signature in presence of two witnesses.

CHARLES BERNARD BUERGER.

Witnesses:
 WILLIAM E. KING,
 ARTHUR V. RUGGLES.